(12) United States Patent
Zanganeh et al.

(10) Patent No.: US 11,435,653 B2
(45) Date of Patent: *Sep. 6, 2022

(54) HIGH TEMPERATURE CAMERA PROBE

(71) Applicant: Her Majesty the Queen in Right of Canada as Represented by the Minister of Natural Resources Canada, Ottawa (CA)

(72) Inventors: Kourosh E. Zanganeh, Ottawa (CA); Carlos Salvador, Ottawa (CA)

(73) Assignee: Her Majesty the Queen in Right of Canada as Represented by the Minister of Natural Resources Canada, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,821

(22) Filed: Jul. 13, 2021

(65) Prior Publication Data

US 2021/0341821 A1 Nov. 4, 2021

Related U.S. Application Data

(63) Continuation of application No. 15/444,981, filed on Feb. 28, 2017, now Pat. No. 11,092,880.

(30) Foreign Application Priority Data

Feb. 15, 2017 (CA) ..................................... 2958002

(51) Int. Cl.
*G03B 17/55* (2021.01)
*H04N 5/225* (2006.01)
*G03B 15/00* (2021.01)
*G01N 21/954* (2006.01)

(52) U.S. Cl.
CPC ............. *G03B 17/55* (2013.01); *G03B 15/00* (2013.01); *H04N 5/2252* (2013.01); *H04N 5/22521* (2018.08); *G01N 2021/9542* (2013.01); *H04N 2005/2255* (2013.01)

(58) Field of Classification Search
None
See application file for complete search history.

(56) References Cited

U.S. PATENT DOCUMENTS

| | | | |
|---|---|---|---|
| 8,574,336 B2 * | 11/2013 | Rundquist | F27D 3/16 75/709 |
| 11,092,880 B2 * | 8/2021 | Zanganeh | H04N 5/22521 |
| 2001/0006072 A1 * | 7/2001 | Kobayashi | H01L 21/67051 134/198 |

(Continued)

*Primary Examiner* — Ricky Chin
(74) *Attorney, Agent, or Firm* — Banner & Witcoff, Ltd.

(57) ABSTRACT

An exemplary embodiment provides a camera probe having an elongated housing provided with an external wall made of heat-resistant material enclosing an internal space. The housing has a forward opening covered by a window of heat-resistant radiation-transparent material and a position within the internal space for mounting a camera positioned to receive radiation from the window. At least one cooling channel is provided within or adjacent to the external wall, at least over a part of the external wall exposed to elevated temperatures during use of the probe. At least one gas exit port is provided adjacent the window and is oriented to cause gas leaving the gas exit port to sweep over an external surface of the window to keep it cool and free of debris.

22 Claims, 9 Drawing Sheets

(56) References Cited

U.S. PATENT DOCUMENTS

| | | | |
|---|---|---|---|
| 2002/0138073 A1* | 9/2002 | Intintoli | A61B 18/22 606/15 |
| 2007/0206942 A1* | 9/2007 | Gyde Heaven | G03B 17/02 348/E5.026 |
| 2007/0271756 A1* | 11/2007 | Aoki | C03B 33/0207 29/281.5 |
| 2008/0143828 A1* | 6/2008 | Mandrachia | G01N 21/8507 348/82 |
| 2008/0166037 A1* | 7/2008 | Mandrachia | G01N 15/1463 382/133 |
| 2009/0229811 A1* | 9/2009 | Schmitt | G01J 5/0014 165/96 |
| 2011/0247456 A1* | 10/2011 | Rundquist | C22B 9/05 266/200 |
| 2011/0264084 A1* | 10/2011 | Reid | A61B 18/02 606/23 |
| 2013/0197855 A1* | 8/2013 | Oskam | G01M 15/14 702/135 |
| 2015/0142163 A1* | 5/2015 | Simon | G01N 33/386 700/158 |
| 2015/0259761 A1* | 9/2015 | Dengel | F27D 3/16 266/81 |
| 2017/0268376 A1* | 9/2017 | Bailey | G02B 23/2476 |
| 2018/0046155 A1* | 2/2018 | Horn | G05B 13/048 |
| 2018/0163280 A1* | 6/2018 | Dengel | F27D 21/00 |
| 2018/0231875 A1* | 8/2018 | Zanganeh | H04N 5/22521 |
| 2018/0325359 A1* | 11/2018 | Watanabe | A61B 1/00096 |
| 2018/0364103 A1* | 12/2018 | Wang | G01J 5/0808 |

\* cited by examiner

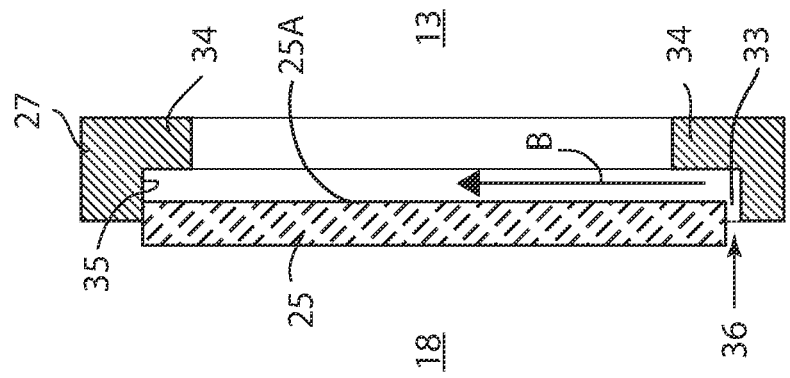
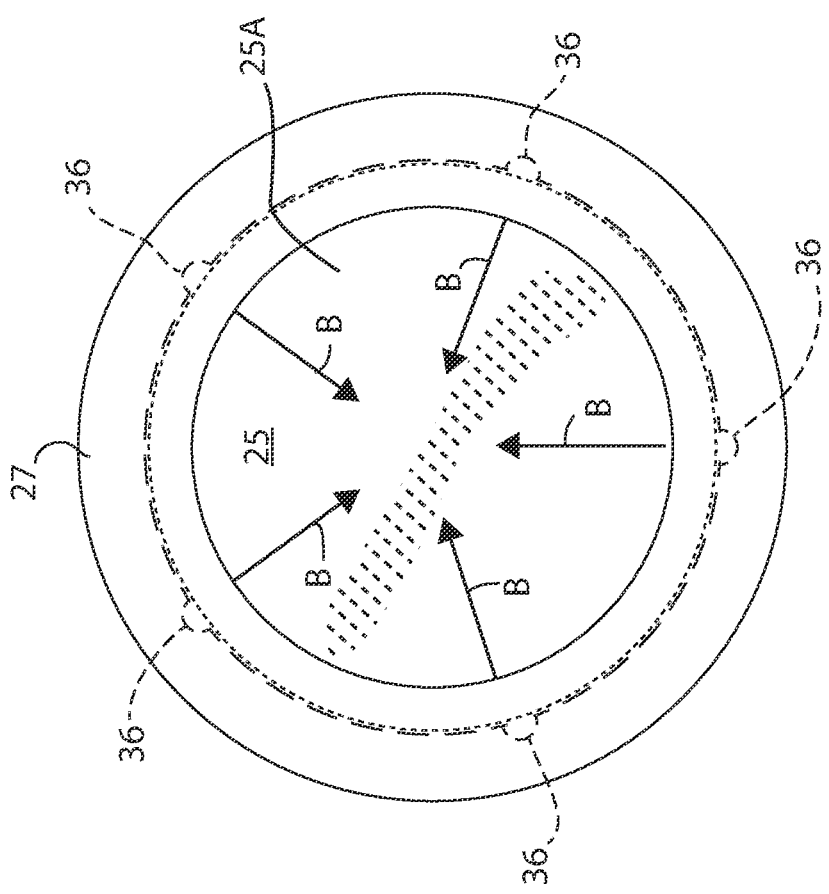
Fig. 2B
Fig. 2A

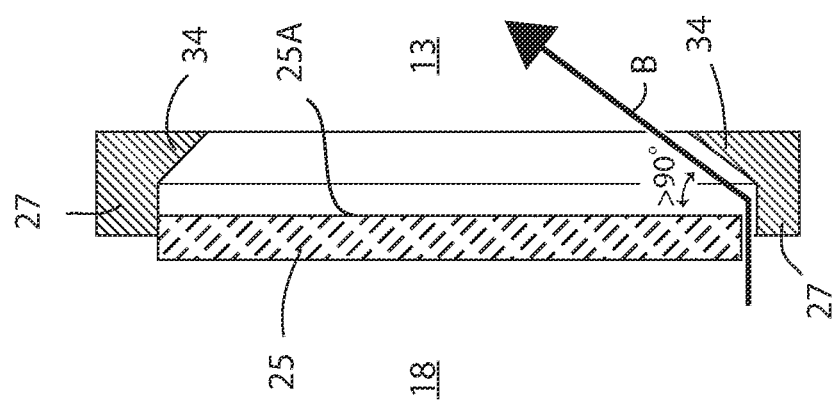
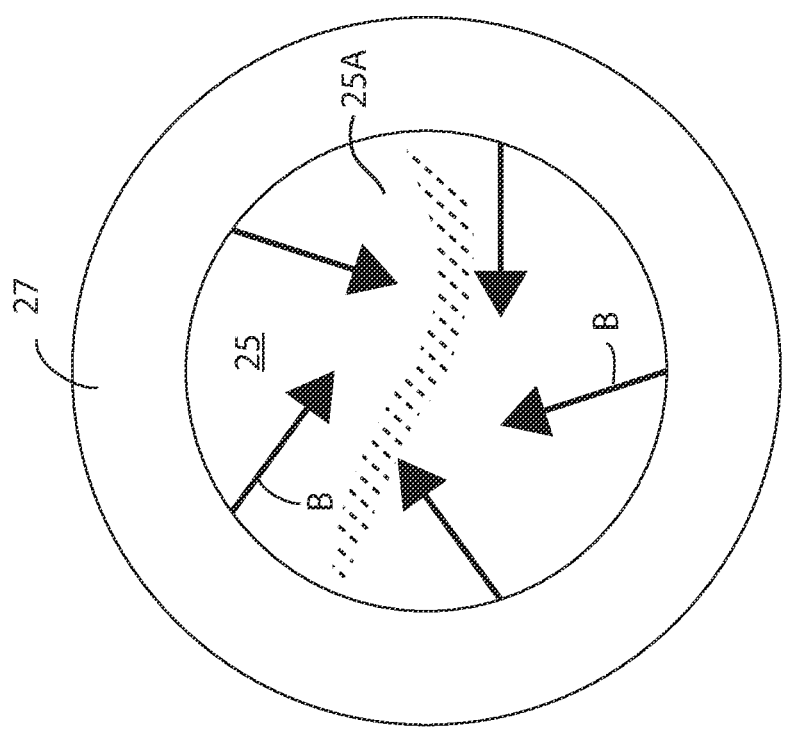
Fig. 3B
Fig. 3A

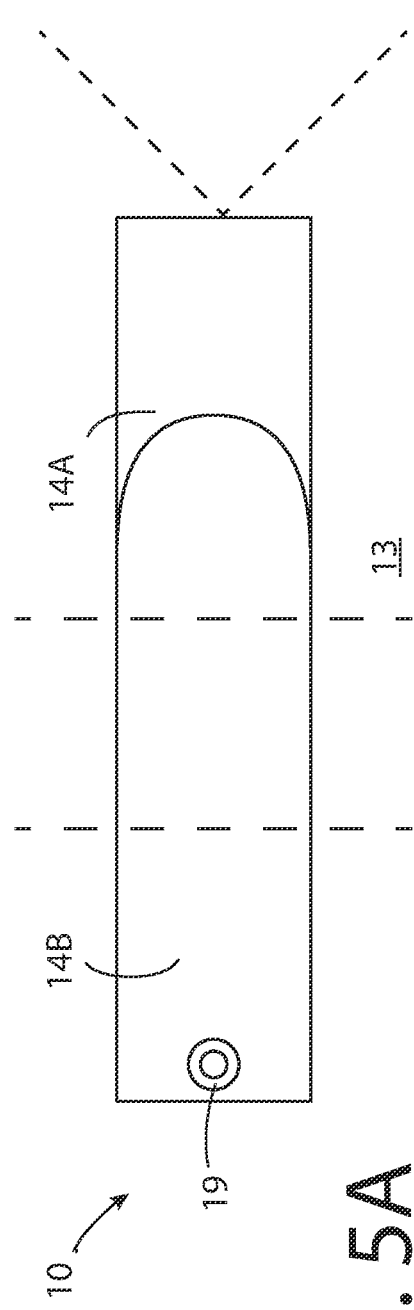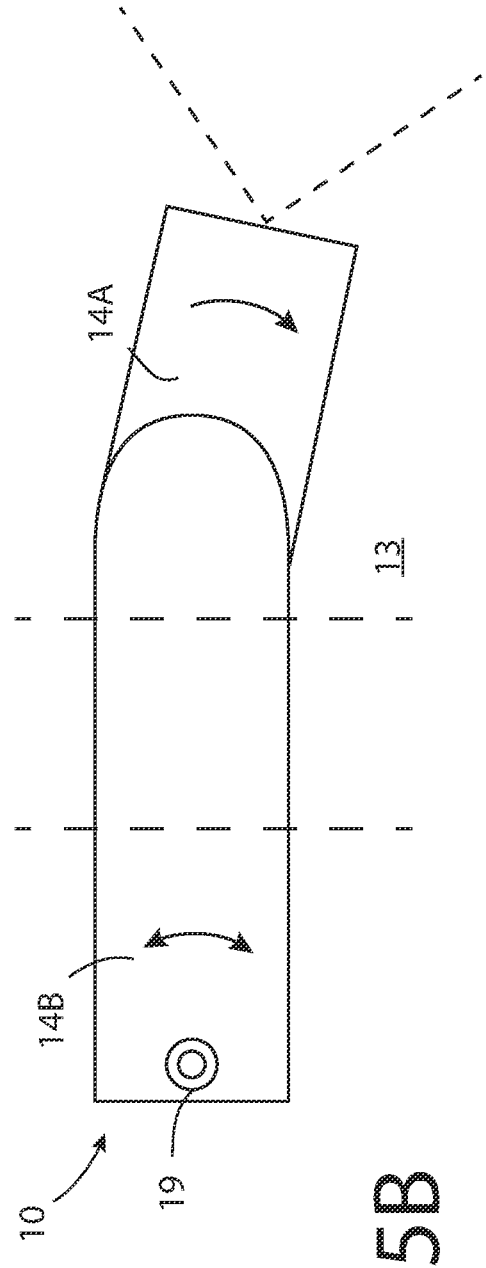

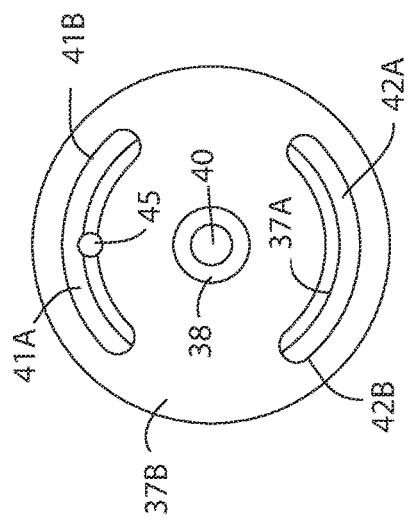
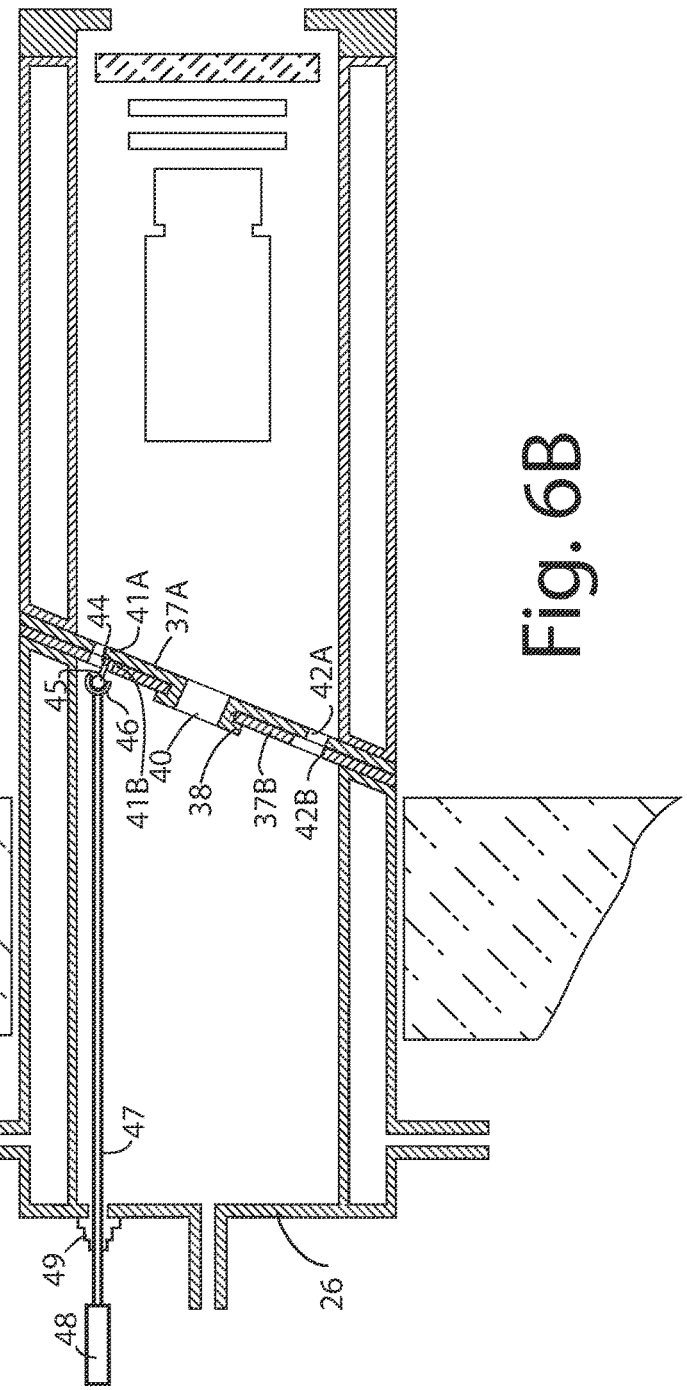

HIGH TEMPERATURE CAMERA PROBE

RELATED APPLICATION DATA

This application is a continuation application of pending U.S. application Ser. No. 15/444,981 filed Feb. 28, 2017; which claims the benefit of Canadian Patent Application number 2,958,002 filed on Feb. 15, 2017, each of which are hereby incorporated by reference in their entireties.

BACKGROUND

(1) Technical Field

The present disclosure relates to devices used for monitoring, observing, measuring, recording, diagnosing and/or controlling conditions or combustion processes within internal volumes of furnaces, boilers, heaters, or similar high temperature enclosures. More particularly, the present disclosure relates to such devices in the form of probes that may be inserted through apertures in the walls of such enclosures.

(2) Description of the Related Art

Many industrial and domestic processes require the use of devices that generate high temperatures within an enclosure, e.g. by burning fuels, introducing hot gases, operating electrical heating elements, etc. For example, the use of furnaces, kilns, boilers, space heaters, etc., is common in industry. In many cases, conditions within the heated interiors of such devices must be observed, measured or recorded in some way to ensure that the devices are operating as expected, to check for problems, to assess when sufficient heating of objects has taken place, to record operating conditions, and the like.

The conventional approach to recording or viewing real-time images of the combustion process within such a device is to observe the process through an existing viewing port using human observation or a video or still (usually digital) camera located outside the device. Alternatively, a video or still camera may be used to view a combustion process via a fiberscope, borescope, endoscope, or through the judicious use of mirrors or prisms, where again the camera is located outside the heated enclosure.

The principle drawback to the conventional approach is that, with rare exceptions, most furnaces, boilers, and the like—industrial, pilot-scale, or otherwise—are constructed with a limited number of viewing ports or none at all. Where such ports do exist they tend to be small and set back from the interior or walls of the device. This results in very narrow viewing angles and fields of view, which greatly restricts the amount of useful information which can be extracted from the interior of a furnace, boiler, etc., such as the conditions within flame combustion zones.

Of course, the problem with providing ports that are closer to the combustion zones is that they are subjected to high temperatures and to thermal radiation. It has therefore been difficult to design viewing and recording apparatus for such environments. Moreover, even when devices of this kind are available, they still tend to have a limited view of critical areas such as combustion zones.

An example of a prior art device of this kind is disclosed in PCT patent publication No. WO 00/04329 to Miller et al. published on Jan. 27, 2000. The reference discloses a fluid cooled lance designed to be held by an operator outside a furnace. The lance has a camera or similar device mounted at the free end that provides a signal to a portable control unit. A water jacket substantially surrounds the camera so that it is protected from heat from the furnace. Air under pressure may be fed through the device.

U.S. Pat. No. 6,778,209 which issued on Aug. 17, 2004 to Eversole et al. discloses a high temperature camera apparatus having an elongated steel camera housing tube and an elongated camera support member. A ceramic heat shield tube surrounds at least a portion of the camera housing tube which contains the camera. The heat shield defines a passage for cooling air to be blown to cool the camera.

PCT patent publication no. WO 99/36738 to Heckensdorn, et al. published on Jul. 22, 1999 discloses a double-walled transparent housing having an inner wall to receive an optical system and an outer wall. A hermetically sealed chamber is formed between the inner and outer wall for protecting the optical system from hostile environments. The apparatus can have means for circulating cooling fluid within the apparatus.

U.S. patent publication no. US 2006/0050147 to Gao et al., published on Mar. 9, 2006 discloses a video camera. The camera is cooled by a pipe-type cooler using cooling water and a blow-down protection gas is passed through the device towards a gap used for viewing by the camera.

U.S. patent publication no. US 2005/0126597 to Hochstein, Jr., et al., published on Jun. 16, 2005 discloses an inspection camera used in conjunction with a shockwave cleaning apparatus. The camera may be inserted into a furnace and includes a light source. A heat shield defines a passage for cooling air to be blown to cool the device.

Despite these disclosures, there is still a need for an improved apparatus for observing the interiors of heated enclosures.

BRIEF SUMMARY

Certain exemplary embodiment provides a camera probe having an elongated housing provided with an external wall made of heat-resistant material enclosing an internal space. The housing has a forward opening covered by a window of heat-resistant radiation-transparent material and a position within the internal space for mounting a camera to receive radiation passing through the window, e.g. directly confronting an internal surface of the window. At least one cooling channel is provided within or adjacent to the external wall, at least over a part of the external wall exposed to elevated temperatures during use of the probe. A gas entry port provided in the housing and communicating with the internal space is positioned remotely from the window. At least one gas exit port is provided adjacent the window and is oriented to cause gas leaving the internal space through the gas exit port to sweep over an external surface of the window to keep the external surface cool and free of debris.

BRIEF DESCRIPTION OF THE SEVERAL VIEWS OF THE DRAWINGS

Exemplary embodiments of the present disclosure are described in detail in the following with reference to the accompanying drawings, in which:

FIG. 2A is an end view of the camera probe of FIG. 1 looking at the forward end of the probe positioned in the furnace;

FIG. 2B is an isolated side view in cross-section of a gas dispersion element (spray ring) positioned at the front of the probe and mounting a window therein;

FIG. 3A is a view similar to FIG. 2A but showing a gas swirling motion caused by orientation of gas exit ports;

FIG. 3B is a view similar to FIG. 2B, but showing a modified form of gas dispersion element;

FIG. 5A is a top plan view of the embodiment of FIG. 4 showing the camera parts aligned with the longitudinal axis of the probe;

FIG. 5B is a top plan view of the embodiment of FIG. 4 showing the forward housing part rotated relative to the rearward part and out of alignment with the longitudinal axis of the probe;

FIG. 6A is an elevational view of an end plate combination as used in the embodiment of FIG. 4 having an attachment for means for rotating one of the end plates with respect to the other;

FIG. 6B is a cross-sectional view similar to FIG. 4, but showing the means for rotating having the attachment of FIG. 6A;

DETAILED DESCRIPTION

In the following description, exemplary embodiments of the camera probe are described in combination with a furnace, in which the camera probe may be exposed to very high temperatures, for example temperatures between 1000-2000° C. are contemplated. However, it will be readily appreciated that the same embodiments may be used with any other heated enclosures having various temperature enclosures, e.g. of the kinds mentioned earlier.

Figure 1:
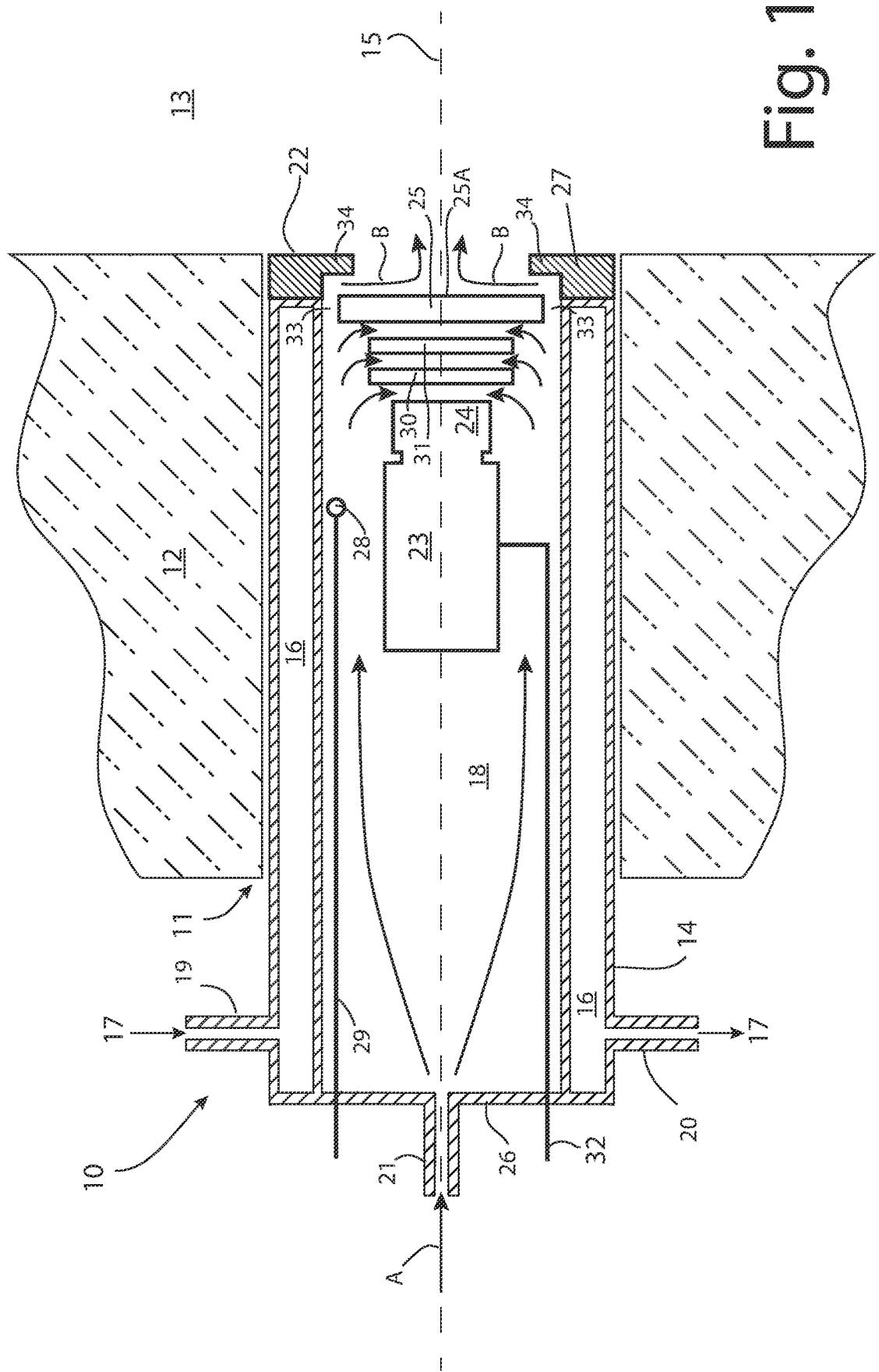
FIG. 1 is a schematic longitudinal cross-section of a camera probe according to an exemplary embodiment of the disclosure in position in a viewing port of a furnace wall.

FIG. 1 shows a camera probe 10 as an exemplary embodiment of one form of the present disclosure. The probe is positioned within an observation port 11 in a wall 12 of a furnace having a heated interior 13. The probe has a housing 14, which in this embodiment is in the form of an elongated circular cylinder (having a central longitudinal axis 15) dimensioned to be slightly smaller in outer diameter than the inner diameter of the observation port 11, which is also cylindrical. The probe housing is preferably made of a high temperature resistant material, e.g. steel (preferably stainless steel), or high temperature alloys of other metals. The observation port 11 may be an existing port in a furnace or a port specially made for the camera probe. There should be sufficient difference in diameter between the housing and the probe walls to allow for expansion of the camera probe as it is heated by the furnace without the probe becoming stuck in the observation port. This difference may be, for example, 2.5 inches or less, and more preferably 1 inch or less, or even 0.5 inch or less, depending on the overall diameters of the probe and the port.

The probe housing 14 is provided with an internal channel 16 for a coolant liquid 17 provided beneath and in contact with the outer wall of the housing and surrounding an interior space 18 within the probe. The channel 16 acts as a cooling jacket for the probe. Coolant liquid 17, e.g. water, oil, water-glycol mixture, or other high-boiling liquid, is introduced into the channel 16 through an inlet tube 19 and is removed from the channel through an outlet tube 20 so that a constant flow of liquid is provided through the channel to remove heat from the probe. Suitable pump equipment (not shown) is provided externally of the probe to circulate the coolant liquid rapidly through the channel 16 to remove heat as quickly as possible to avoid over-heating of the interior space 18.

The probe housing 14 has a further inlet tube 21 at the rearward end 26 of the housing leading directly into the interior space 18. In the illustrated embodiment, the inlet tube is positioned on the axis 15 of the device, but may alternatively be positioned elsewhere. This inlet tube 21 is used to introduce a gas under pressure into the interior space 18. The gas exits the interior space at a forward end 22 of the probe via a gas directing element 27 (often referred to as a gas "spray ring") into the furnace interior 13. The function of this element 27, which is described in more detail later in this description, is to constrain and direct the flow of gas as it leaves the interior space 18 and it may be made, for example, of steel (preferably stainless steel), a high temperature metal alloy, or a refractory or ceramic material, e.g. silica or alumina, or a composite of such materials. The flow of gas through the interior space 18 from inlet tube 21 to gas directing element 27 also helps to keep the interior cool. The gas employed for this may be any relatively non-corrosive gas such as, for example, air, carbon dioxide, nitrogen, argon, cooled dry flue gas (free of corrosive components and particulates), etc. The gas may be pre-cooled to a temperature below ambient, or may be supplied at ambient temperature, or somewhat above depending on the degree of cooling required and the nature of the environment. The temperature of the gas within the internal space 18 may be measured and monitored by a temperature sensing device 28 connected to the exterior by a wire 29 or cable for conveying data from the device to external monitoring apparatus (not shown). The output of the device may be used to control the flow of gas through the housing to achieve the desired degree of cooling or to provide a warning if the temperature exceeds a critical level so that the probe can be removed from the observation port and allowed to cool down.

The interior space 18 contains a position for a camera 23, which may be a video camera or a still camera that takes individual shots, and may be sensitive to visible light, ultraviolet light and/or infrared radiation. The position provided for the camera may contain a mounting device (not shown) for the camera, e.g. a mounting bracket or dock to hold the camera firmly in place and to facilitate insertion and removal of the camera. Alternatively, the camera may be mounted permanently within the probe. Cameras suitable for this purpose, especially modern digital cameras containing charged coupled devices (CCD), can be made quite small, so the diameter of the probe can be kept quite narrow, e.g. a few centimeters. The camera may be controlled or monitored from outside the probe, e.g. via a wire 32 or cable that may transmit instructions to the camera (e.g. instructions to focus, zoom, control light attenuation, operate the shutter, control the shutter speed, and the like) and/or that may return a video signal of the image observed and/or recorded either in real time or off-line from an internal memory. Alternatively, these functions may be achieved wirelessly by means of suitable transceivers of known kinds.

The camera 23 is provided with a lens 24 or light-receiving aperture or sensor that faces the forward end 22 of the probe provided with a window 25 made of a heat-resistant radiation-transparent material to enable the transmission of such radiation to the lens, aperture or sensor of the camera. The material may be transparent to visible light (preferably 390-790 nm wavelength), infra-red light (preferably 850-40,000 nm wavelength) or UV light (preferably 200-300 nm wavelength), or a combination thereof, depending on the wavelength recording ability of the camera 23. For example, the window may be made of a high temperature resistant borosilicate glass, quartz, sapphire, etc., that transmits visible, UV and infra-red radiation. Hence the camera 23 can "see" through the window 25 into the furnace interior 13 and record or transmit images from the available field of view. The window 25 may be bonded or fused to a support structure (not shown) within the housing 14, but is more preferably attached directly to the gas dispersing element 27, as will be explained more fully later.

The probe may also be provided with one or more optical filters 30, 31 mounted between the camera 23 and the window 25 to make it possible to select, attenuate or modify radiation before it reaches the camera. Such filters, which may have spectral ranges in the visible, ultraviolet or infra-red ranges, or combinations thereof, may be absorptive or reflective, or a combination thereof. The filters may be made of glass, quartz and KG3, among other relatively high temperature resistant materials. These elements are preferably spaced from each other and from the camera 23 and the window 25 to leave channels for circulation of the cooling gas. Hence, the gas introduced through tube inlet tube 21 indicated by arrow A passes through the interior space 18, around the camera 23 and optical filters 30, 31, over the interior surface of window 25 and eventually out through passages 33 to the interior of the furnace 13. As indicated by arrows B, the gas directing element 27 directs the exiting gas towards the central axis 15 across the outer surface 25A of window by virtue of the lip 34 projecting inwardly around the periphery of the window 25. The exiting gas streams B cool the outer surface 25A of the window and keeps it clear of particulate or condensing matter from the furnace interior. In this way, the interior space 18 can be kept sufficiently cool to allow the camera to operate properly and to avoid overheating and obscuring of the window 25 at the front of the probe.

As will be apparent from the description below, the passages 33 providing outlets for the cooling gas to the exterior of the probe may take on various alternative forms. However, their combined cross-sectional area is preferably such that it constricts the flow of gas through the probe, allowing the gas to flow at a suitable velocity around the camera 23 and optical filters 30, 31 while directing the gas as a jet or jets B across the outer surface of the window 25 at a desired rate of flow. Preferably, the combined cross-sectional area of the passages 33 is less than that of the gas inlet tube 21. Most preferably, the pressure of the gas A introduced into the interior space 18, and hence the internal pressure of the interior space 18, is adjusted to be slightly greater than the pressure of the furnace interior 13 so that there is an adequate flow of gas through the probe into the furnace, but without creating significant gas currents within the furnace interior that might affect the operation of the furnace.

FIGS. 2A and 2B are, respectively, a front view and a vertical-section side view of a window 25 and gas directing element 27 which may be employed with the probe of FIG. 1. The window 25 is securely mounted at its periphery within a cylindrical retaining surface 35 of the element 27, either by means of a friction fit, or with mechanical or adhesive retention. The cylindrical surface 35 is provided with semi-cylindrical indentations 36 at regular intervals around the surface (in the illustration, there are 5 such indentations set at 72° relative to each other). These indentations form the passages 33 that allow gas from the interior space 18 to escape from the probe 10 to the furnace interior 13. Alternatively, the semi-cylindrical indentations 36 may be replaced by equally-spaced slots, or the window 25 may be held in place by a frame forming the passages 33 that allow the gas from the interior space 18 to escape from the probe 10. The escaping gas creates gas streams B that are generally radial and are directed to the center of the window 25 where the colliding streams deflect away from the window as shown in FIG. 1.

As shown in FIG. 3A, the streams B can be deflected so that they move slightly off the radial all in the same direction to create a swirling flow of gases, or vortex, over the outer surface 25A of the window 25, as shown in FIG. 3A. This can be done by suitably angling the passages 33 off axis. Alternatively, or additionally, the streams B may also be deflected outwardly away from the center of the window as shown in FIG. 3B. In this case the lip 34 of the element 27 is chamfered so that stream B has an outward axial component. The streams should have an angle less than 90° to the surface 25A of the window 25, and may more preferably in a range of 0 to 75°.

In any event, the streams B generally cover the entire exposed surface 25A of the window 25 so that even cooling and cleansing of the surface is achieved.

The probe 10 of FIG. 1 may be made of any desired length provided it is long enough to fit within an observation port 11 with suitable depth to reach approximately to the internal surface of the furnace wall with a sufficient amount of the probe extending at the rearward end to allow for access to tubes 19, 20, 21, etc. and to allow for withdrawal of the probe after use. Specific probes may be made for specific furnaces, or a single probe of suitable length for all likely furnace wall widths and designs may be provided as a general tool. As noted, the transverse shape of the probe is normally circular, but may be of any other shape, e.g. square, rectangular, hexagonal, octagonal, etc., to correspond to the shape of an observation port with which it will be used. The shape of the probe is also adjusted to correspond to the selected camera 23 and optical filters 30, 31. The probe and camera may be inseparable and therefore functioning as an integrated system.

The housing 14 of the probe may have a removable part (not shown), e.g. a rear part, that can be detached from the remainder for access to the interior space 18 to allow for camera insertion, maintenance and repair.

Pictures or information from the camera may be used for autocorrelations, and/or cross-correlations with temperature and/or fuel composition data from a combustion zone within the furnace interior 13.

Figure 4:
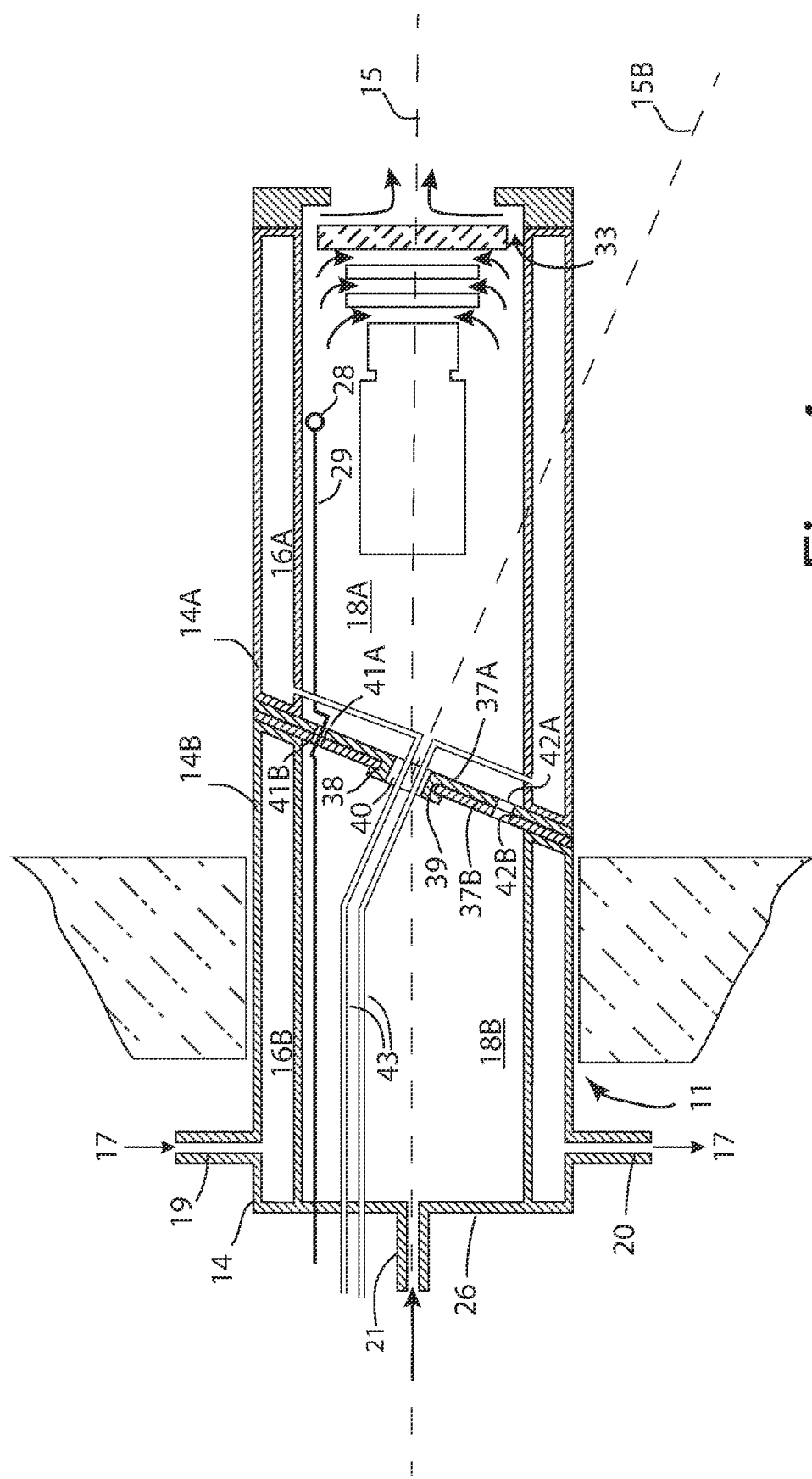
FIG. 4 is a longitudinal cross-sectional view similar to FIG. 1, but showing a camera probe made up of two housing parts.

FIG. 4 of the accompanying drawings shows an alternative exemplary embodiment in which the probe housing 14 is made in two mutually pivotable parts, i.e. a forward part 14A and a rearward part 14B. Each part has an end plate 37A, 37B arranged at the same angle to the central longitudinal axis 15 of the probe so that the end plates fit snugly against each other. The angle is preferably a minimum of 10° and a maximum of 170°. The end plate 37A has an outwardly projecting hub 38 that fits precisely within a central hole 39 of the other end plate 37B, the extreme end of the hub 38 being outwardly turned to capture the end plate 37B around the hole 39, but with a degree of engagement that permits the end plates 37B to pivot easily around the hub 38. Although not shown, the connection between plates 37A and 37B may also be provided with bearings, bushings, etc., to ensure easy and smooth mutual rotation. The hub has a central hole 40 passing completely longitudinally therethrough to provide communication between the interior spaces 18A, 18B of the housing parts 14A, 14B. The plates 37A, 37B also have elongated mutually aligned arcuate slots 41A, 41B and 42A, 42B (similar to those of FIG. 6A) that penetrate through their respective end plates and thus form further communication between the interior spaces 18A and 18B. Alternatively, equally placed holes of appropriate size may be used instead of the slots. The hole 40 and the slots 41A, 41B and 42A, 42B allow the cooling gas from the inlet tube 21 to pass through both interior spaces 18A, 18B and through to the outlet passages 33 as in the previous embodiment. The holes and grooves also allow physical elements to pass between the interior spaces. For example, hole 40 accommodates flexible coolant tubes 43 and grooves 41A, 41B accommodate the wire 29 from temperature sensing device 28. The flexible coolant tubes 43 are provided to supply coolant liquid to, and to return coolant liquid from, the coolant liquid channel 16A of the forward housing part 14A, as this channel is separated by end plates 37A, 37B from coolant channel 16B of the rearward housing part 14B supplied via tubes 19 and 20.

The joint between the forward part 14A and the rearward part 14B is kept cool by virtue of the coolant liquid flowing through the channels 16A and 16B and by virtue of the coolant gas passing through the interior spaces 18A and 18B. The snug contact between end plates 37A and 37B prevents hot gases from entering the joint.

As noted, the forward housing part 14A may be pivoted or rotated with respect to the rearward housing part 14B by virtue of the interconnection of the hub 38 and hole 39 acting as a pivot point. The housing parts may thus be pivoted initially around a longitudinal axis 15B. As shown in the top plan views of FIGS. 5A and 5B, when such pivoting is carried out, the forward part of the housing 14A rotates out of axial alignment with the rearward part 14B so that the camera can "see" different parts of the furnace interior 13. The forward part 14A is moved to one side and slightly down from the mutually aligned position of FIG. 5A. The forward part can, of course, alternatively be rotated in the opposite direction to make further changes to the field of view. Further fields of view may also be obtained by rotating the rearward part 14B within the viewing port 11 (FIG. 4) when the forward part 14A is angled relative thereto. The "aligned" position of FIG. 5A provides the probe with a right cylindrical shape that is necessary to allow the probe 10 to be introduced through the cylindrical viewing port 11 and is useful to provide a "full-ahead" field of view. The rotated positions can then be used, as required, to view areas of the furnace interior not visible from the full-ahead position. Of course, after such rotation, the forward part must be rotated back to the fully aligned position before the probe is removed from the viewing port.

The forward part 14A of the housing may be rotated by an external mechanism (external to the probe) if there is room for such mechanism to pass through, and operate within, the viewing port. For example, a stiff rod of temperature resistant metal may be welded at one end to the external surface of the forward housing part 14A and passed back through the viewing port and provided with a handle at a position where an operator can move the rod around the probe housing from outside the furnace. More preferably, however, an internal mechanism is provided to enable rotation of the forward part 14A. This allows the outside diameter of the probe to be matched more closely to the inside diameter of the viewing port 11 to minimize loss of heat and furnace gases through the port. In a simple solution, a similar metal rod may be attached at one end to the end plate 37A of the forward housing part and then passed back through the interior space 18B of the rearward housing part 14B and through the housing wall at the rearward end 26 of the probe, preferably through an aperture having a flexible cover or the like to prevent escape of the cooling gas from the interior of the housing.

An arrangement of this kind is illustrated in FIGS. 6A and 6B. FIG. 6A shows the end plates 37A, 37B in isolation as viewed from the interior space 18B of the rearward housing part 14B. In this embodiment, the slots 41B and 42B are larger in width than the slots 41A and 41B so that just a part of the end plate 37A is visible through the slots in end plate 37B. An upright post 44 (FIG. 6B) is fixed to a central visible part of end plate 37A so that it extends through the groove 41B. The upright post ends in a spherical enlargement 45 that is partially captured by a hollow spherical retainer 46, so that the elements 45 and 46 provide a movable ball and socket joint. The spherical retainer is attached to an operating rod 47 that passes back through the interior space 18B and through a hole in the rearward end 26 of the probe to a handle 48. Gases are prevented from escaping through the hole by means of a flexible covering 49. Movement of the handle 48 causes the operating rod 47 to pivot so that the retainer 46 causes the end plate 37A to rotate around the hub 38 to a desired extent, thereby rotating the forward part 14A of the probe.

As a further alternative for rotating the housing part 14A, an electric motor (not shown) may be mounted within the probe to cause the end plates 37A, 37B to rotate in a controlled manner. The motor, e.g. a compact linear motor of the kind used to focus camera lenses, may be operated from a control switch located on the rearward end 26 of the probe.

The forward and rearward parts 14A, 14B of the probe housing may be made of any suitable length according to the facilities in which they are to be used. The length of the rearward part 14B should of course be such that the forward part 14A may extend fully into the interior of the furnace to allow for the desired pivotal rotation.

Figure 7:
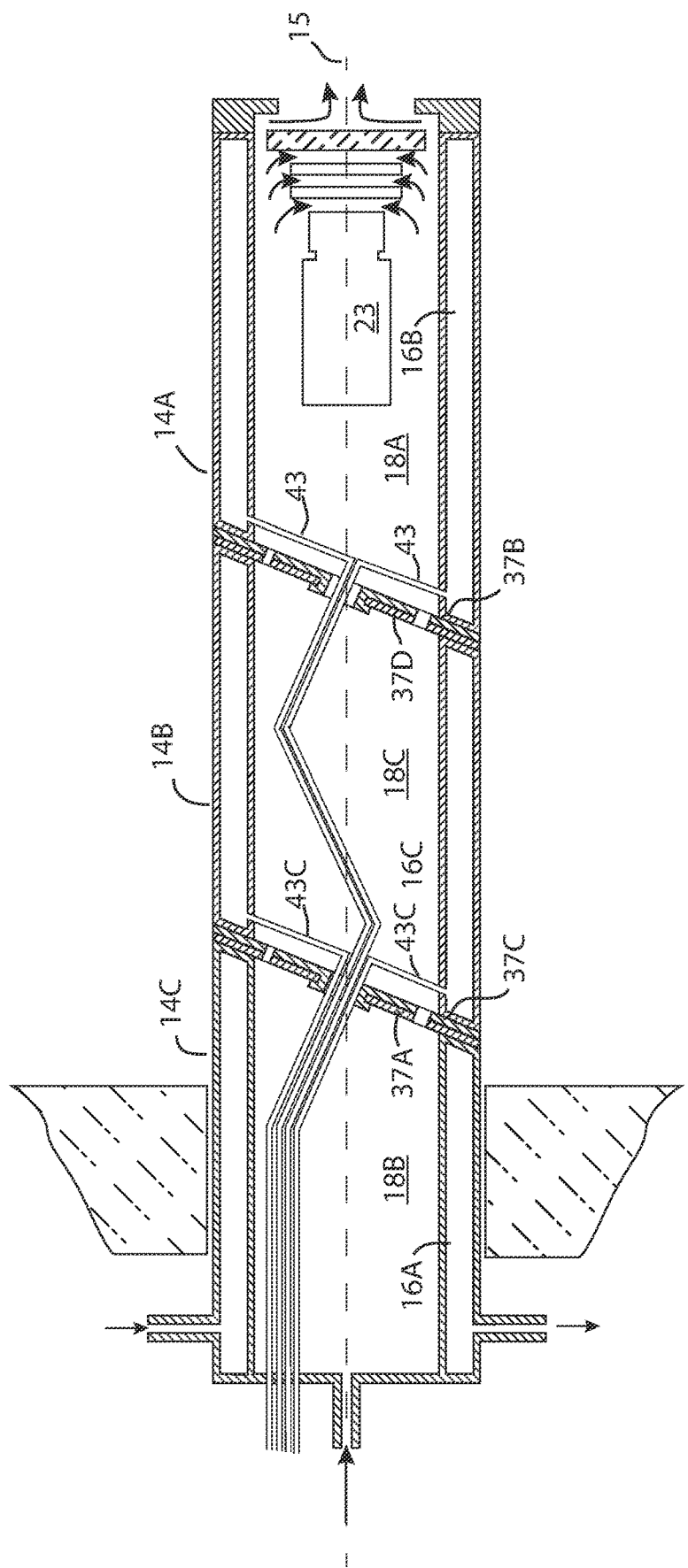
FIG. 7 is a longitudinal cross-section similar to FIG. 1, but showing a further alternative embodiment made up of three housing parts.

To obtain even greater freedom of movement of the end of the probe 10, one or more additional rotational housing parts may be inserted between the forward part 14A of the housing and the rearward part 14B. An embodiment of this is shown in FIG. 7 of the accompanying drawings. This embodiment has a single additional rotational housing part 14C pivotally connected to both the forward part 14A and the rearward part 14B using end plates 37C and 37D. Just like the forward part 14A, the additional housing part 14C has a channel 16C for coolant liquid supplied via flexible tubes 43C while providing passage for tubes 43 leading to channel 16A of the forward part 14A. Also, coolant gas is free to flow through the additional housing part to the forward housing part 14A by virtue of holes and slots provided in the end plates 37B, 37C, 37D, 37A. As in previous embodiments, the coolant gas flows around the camera 23, lenses 24 and window 25 and out to the interior 13 of the furnace. Although not shown, the probe is provided with means (e.g. rods or motors) to rotate both additional housing part 14C and forward housing part 14A with respect to each other and with respect to rearward housing part 14B.

This allows very complex control of the movements of forward housing part 14A so that even more interior areas of the furnace can be seen by the camera. In the illustrated embodiment, the angle of end plates 37A, 37D relative to the central longitudinal axis is the same as the angle of end plates 37B, 37C, but this does not have to be the case. Each of the combinations of end plates 37A, 37D and 37C, 37B can be provided with any angle from the preferred range of 10° to 170° mentioned above to provide any degree of direction control required. For example, the pair 37A, 37D may be provided with a large angle for rapid movement over large arcs, whereas the combination 37B, 37C may be provided with a shallow angle for more limited but precise control of an area once identified as of interest.

Of course, more than one additional housing part may be interposed between the rearward part and the forward part if an even greater possibility of movements is required, but this comes at the cost of increasing complexity and costs of manufacture of the probe.

The above embodiments have employed pairs of pivoted end plates arranged at an angle to the central axis of the probe to allow movements of the forward housing part. However, in other embodiments, alternative means may be provided. For example, concentric cylinders or collars may be used in place of the end plates. Furthermore, a sliding or hinged joint may be employed or an accordion style joint, a universal joint or other flexible joint system. All such joint systems should allow the parts of the housing to be mutually aligned along the central longitudinal axis of the probe so that the probe can be inserted into and removed from a viewing port 11 of dimensions similar to the outer dimensions of the probe.

Figure 8:
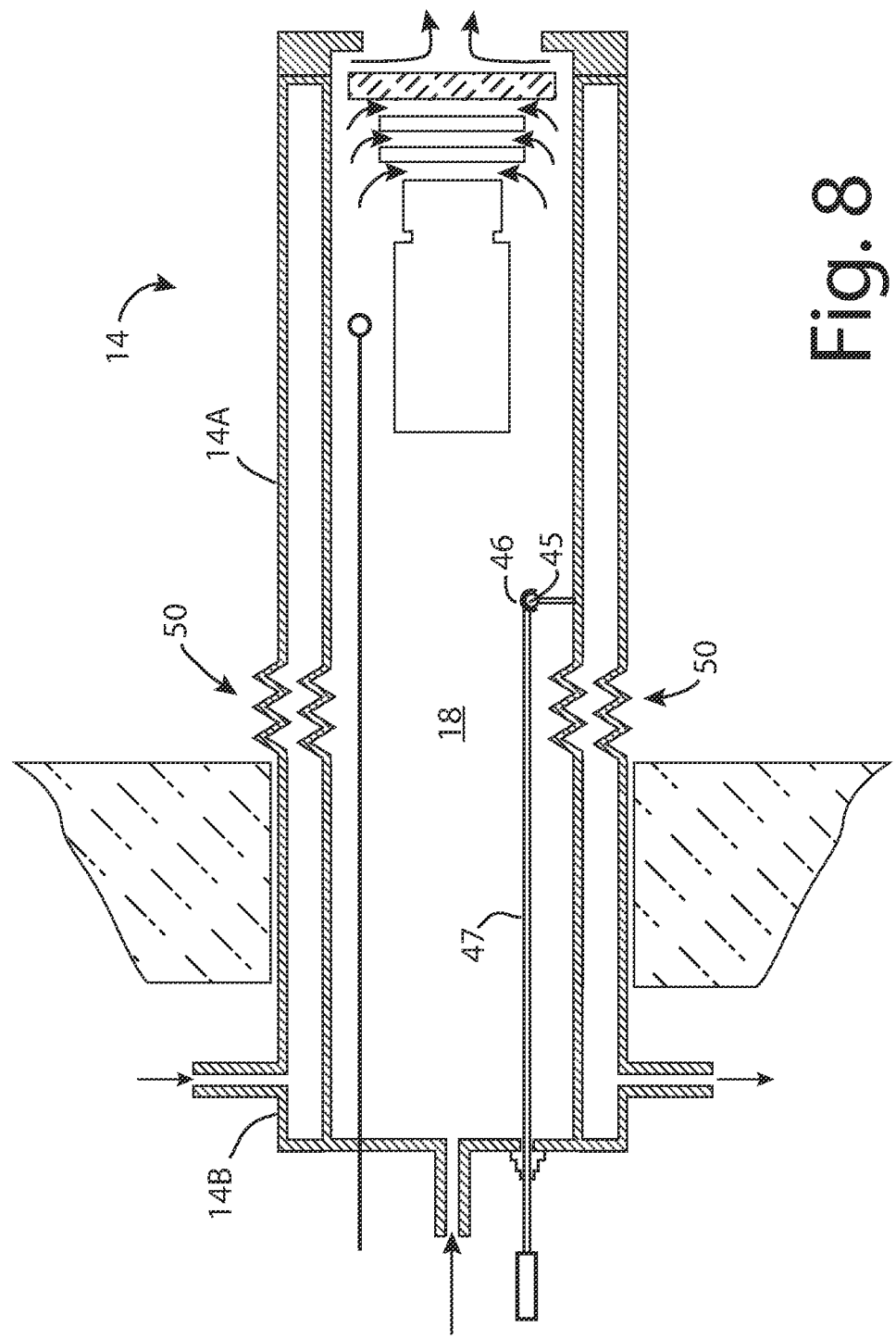
FIG. 8 is a longitudinal cross-section similar to FIG. 1, but showing yet another alternative embodiment having accordion-style pleats in the outer wall to permit movement of a forward part of the housing relative to a rearward part.

An embodiment showing an accordion type of joint is shown in FIG. 8. This embodiment is similar to the embodiment of FIG. 1, but it is elongated so that a forward part 14A extends into the furnace interior while a rearward part 14B remains within the viewing port 11. The metal housing and the inner wall of the channel 16 for coolant liquid are provided with accordion style pleats 50 between the two housing parts 14A and 14B. The pleats to not block the channel 16, so that coolant liquid may flow fully around the interior space 18 when fed from tubes 19 and 20, thus simplifying the coolant delivery compared to the earlier embodiments having pivotal forward parts. However, the pleats 50, despite being made of metal, do provide the housing 14 with a degree of flexibility so that the forward part 14A can be pivoted relative to the rearward part 14B by manipulation of an operating rod 47 attached to an interior surface of the forward part 14A either by a ball and socket arrangement 45, 46 as shown or by direct welding or other inflexible attachment. Alternatively, a linear actuator or other motor may be built into the probe to provide the desired manipulation.

Figure 9:
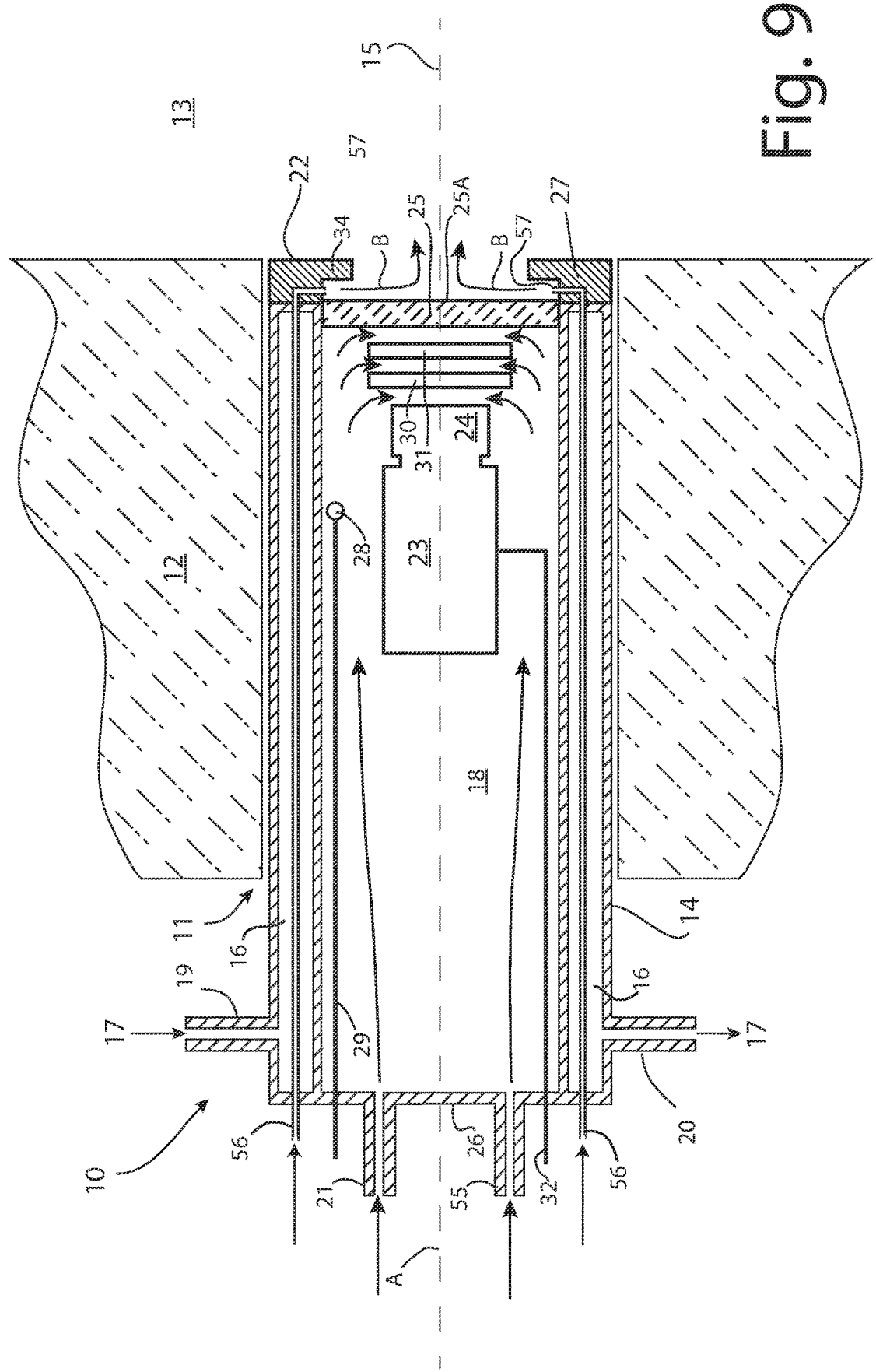
FIG. 9 is a cross-section similar to that of FIG. 1 showing an alternative embodiment in which gas employed for sweeping the probe window is supplied separately from the gas used to cool the interior space of the probe.

In the above embodiments, cooling gas introduced into the interior space 18 is exhausted into the interior 13 of the furnace and is used to cool and sweep the outer surface 25A of the probe window 25. In an alternative embodiment, gas from a separate supply is used for this purpose and the gas used to cool the interior space 18, if provided at all, is caused to exit the probe at the rear, i.e. outside the furnace interior 13. An embodiment of this kind is illustrated in FIG. 9. This embodiment is similar to that of FIG. 1, but the probe window 25 completely seals the front end of the probe so that gas from the interior space 18 does not pass around the window and out into the furnace interior. Instead, the gas, having been introduced into the interior space 18 through inlet tube 21 as before, is exhausted through outlet tube 55 provided at the rear face 26 of the probe. Gas from the same or a different supply is passed through gas delivery tubes 56 which extend through the channels 16 for coolant liquid from the rear face 26 to the forward end of the probe where they pass through the gas directing element 27 and emerge in front of the probe window 25. There are several such tubes spaced evenly around the probe. The tubes 56 end in gas exit ports in the form of nozzles 57 positioned adjacent to, and peripherally around, the outside surface 25A of the window. The nozzles are directed generally radially towards the central axis 15 of the probe to create the kind of gas flow shown in FIG. 2A, 2B, 3A or 3B. By this means, the temperature, pressure and rate of flow of the gas employed for sweeping the outside surface of the window can be made appropriate for this purpose independently of the temperature, pressure and rate of flow of the gas used to cool the interior space 18 of the probe. Furthermore, by passing the tubes through the channels 16 containing coolant, the gas can be shielded somewhat from the temperature inside the furnace.

Although specific embodiments of the probe are described in detail above, it will be apparent to persons skilled in the art that various modifications and alternative arrangements may be made without departing from the scope of the present disclosure.

The invention claimed is:

1. A camera probe, comprising:
an elongated housing having an external wall made of heat-resistant material enclosing therein an internal space, said housing having a forward opening covered by a window of heat-resistant radiation-transparent material, and a position within said internal space for mounting a camera to receive radiation passing through said window;
at least one channel for liquid coolant within or adjacent to said external wall, at least over a part of said external wall exposed to elevated temperatures during use of the probe; and
at least one gas exit port adjacent to said window oriented to direct gas passing through said at least one gas exit port to sweep over an external surface of said window,
wherein said elongated housing comprises a forward part having a longitudinal axis and containing said window, and a rearward part remote from said window, said forward part being movable relative to said rearward part out of initial alignment with a central longitudinal axis of said rearward part, and
wherein said elongated housing has at least one additional part that is positioned between said forward part and said rearward part and is configured to facilitate movement of said forward part and/or said rearward part relative to one another.

2. The camera probe according to claim 1, wherein said at least one additional part is movable relative to said forward part and said rearward part out of initial alignment with said longitudinal axis of said rearward part.

3. The camera probe according to claim 2, including means for moving said forward part relative to said rearward part.

4. The camera probe according to claim 3, wherein said means includes an elongated rod attached to an internal surface of said forward part and extending rearwardly through said internal space of said rearward part and exiting the housing.

5. The camera probe according to claim 3, wherein said means comprises an internal motor acting on said forward part.

6. The camera probe according to claim 2, including means for moving said forward part and said at least one additional part relative to said rearward part.

7. The camera probe according to claim 6 wherein said means comprises an elongated rod for each of said forward part and said at least one additional part, each rod acting at one end on its respective part and extending rearwardly through said internal space of said rearward part and exiting the housing.

8. The camera probe according to claim 6, wherein said means comprises an internal motor for each of said forward part and said at least one additional part, each motor acting on its respective part.

9. The camera probe according to claim 1, including means for moving said forward part relative to said rearward part.

10. The camera probe according to claim 9, wherein said means includes an elongated rod attached to an internal surface of said forward part and extending rearwardly through said internal space of said rearward part and exiting the housing.

11. The camera probe according to claim 9, wherein said means comprises an internal motor acting on said forward part.

12. The camera probe according to any one of claim 1, wherein said at least one additional part comprises an end plate of said forward part and an end plate of said rearward part, said end plates being orientated at a common angle to said longitudinal axis of said rearward part, and said end plates abutting each other while being mutually rotatable.

13. The camera probe according to claim 12, wherein one of said end plates has a cylindrical projection acting as a hub for another of said end plates to permit said mutual rotation.

14. The camera probe according to claim 13, wherein said hub has a passage therethrough to allow gas to pass through said internal space from said forward part to said rearward part.

15. The camera probe according to claim 12, wherein said end plates each have an arcuate slot therein, said slots being mutually aligned to allow gas to pass therethrough.

16. The camera probe according to claim 12, wherein said end plates isolate parts of said channel for coolant in different parts of said housing, and wherein additional coolant liquid supply and withdrawal tubes are provided for each of said parts of said channel in housing parts other than said rearward part.

17. The camera probe according to claim 12, wherein said common angle is selected from within a range of 10 to 170°.

18. The camera probe according to claim 1, wherein said at least one additional part comprises a region of said housing having accordion-like pleats in said external wall of said housing wall, wherein said region having accordion-like pleats is positioned between the forward and rearward parts of said housing and allows movement of said forward part relative to said rearward part.

19. The camera probe according to claim 1, wherein said at least one additional part comprises a flexible joint system that is a universal joint or a hinge positioned between the forward and rearward parts of said housing.

20. The camera probe according to claim 1, further comprising a camera mounted at said position for mounting a camera.

21. The camera probe according to claim 20, wherein said camera is sensitive to radiation selected from the group consisting of visible light, ultra-violet light, infra-red radiation, and combinations thereof.

22. The camera probe according to claim 20, further comprising at least one filter for radiation positioned between said camera and said window.

* * * * *